(12) United States Patent
Nakasato et al.

(10) Patent No.: US 6,474,945 B1
(45) Date of Patent: Nov. 5, 2002

(54) FLAP HINGE MECHANISM, METHOD FOR MANUFACTURING THE SAME, AND FLAP HINGE APPARATUS

(75) Inventors: Eiichi Nakasato, Kakamigahara (JP); Noriaki Katayama, Kakamigahara (JP); Tetsuya Hori, Kakamigahara (JP); Asao Kakinuma, Kakamigahara (JP)

(73) Assignee: Advanced Technology Institute of Commuter Helicopter, Ltd., Gifu (JP)

( * ) Notice: Subject to any disclaimer, the term of this patent is extended or adjusted under 35 U.S.C. 154(b) by 0 days.

(21) Appl. No.: 09/662,615

(22) Filed: Sep. 15, 2000

(30) Foreign Application Priority Data

Sep. 17, 1999 (JP) .............................. 11-264054

(51) Int. Cl.[7] ................................ B64C 9/00
(52) U.S. Cl. .................. 416/23; 416/241 R; 29/889.7
(58) Field of Search ................ 416/23, 24, 229 R, 416/230, 241 R; 29/889.7

(56) References Cited

U.S. PATENT DOCUMENTS

| | | | |
|---|---|---|---|
| 4,696,623 A | * 9/1987 | Bost ........................... | 416/230 |
| 5,224,826 A | 7/1993 | Hall et al. | |
| 5,350,614 A | 9/1994 | Chase et al. | |
| 5,463,794 A | 11/1995 | Erland | |
| 5,622,336 A | * 4/1997 | Chavanne et al ........ | 244/129.1 |
| 5,639,215 A | * 6/1997 | Yamakawa et al. ........... | 416/23 |
| 5,945,053 A | 8/1999 | Hettinga | |
| 5,961,288 A | * 10/1999 | Legendre et al. ....... | 416/134 A |
| 6,168,379 B1 | * 1/2001 | Bauer ......................... | 416/23 |

FOREIGN PATENT DOCUMENTS

| | | |
|---|---|---|
| EP | 0-875-647 A1 | 11/1998 |
| EP | 0 -939-029 A2 | 9/1999 |
| WO | WO 00/63073 | 10/2000 |

OTHER PUBLICATIONS

Steven R. Hall et al., "Development of a piezoelectric servoflap for helicopter rotor control", Smart Materials and Structures, vol. 5, No. 1, pp. 26–34, Feb. 1, 1996.

* cited by examiner

Primary Examiner—Edward K. Look
Assistant Examiner—Richard A. Edgar
(74) Attorney, Agent, or Firm—Wenderoth, Lind & Ponack, L.L.P.

(57) ABSTRACT

A flap hinge mechanism has a blade-secured portion secured to blade, a flap-secured portion secured to flap, and a coupling portion which couples the blade-secured portion and the flap-secured portion so as to permit angular displacement. The blade-secured portion, coupling portion, and flap-secured portion are formed of fibers which serve as composite material. The fibers of the blade-secured portion and flap-secured portion are impregnated with matrices, and the fibers of the coupling portion are not impregnated with a matrix. Such constitution permits attainment of smooth flap motion in spite of large centrifugal forces, making the achievement of thin, light designs possible.

11 Claims, 9 Drawing Sheets

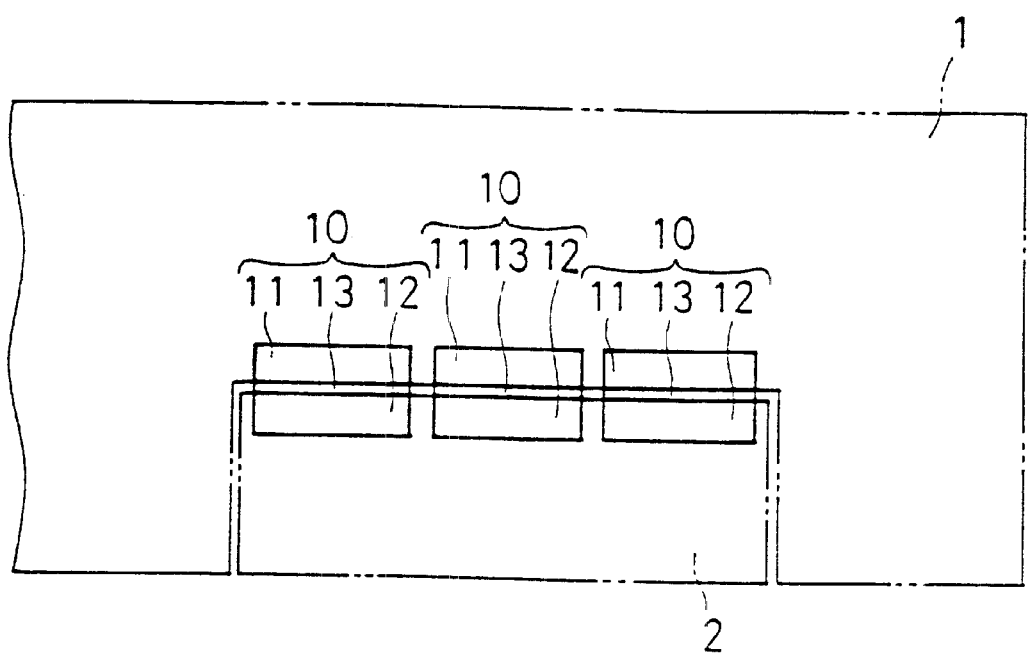

FLAP HINGE MECHANISM, METHOD FOR MANUFACTURING THE SAME, AND FLAP HINGE APPARATUS

BACKGROUND OF THE INVENTION

1. Field of the Invention

The present invention relates to a flap hinge mechanism for attaching a flap to a helicopter rotor blade, as well as a method for manufacturing the same, and relates to a flap hinge apparatus.

2. Description of the Related Art

Rotation of a helicopter rotor blade causes a centrifugal force action proportional to the distance from the rotor center and to the square of the rotational velocity of the rotor, and the centrifugal force can reach approximately 800 G at the tip of the blade. When the rotor blade is provided with a flap, a centrifugal force dependent on the mass thereof will act on the center of mass of the flap. In the flap hinge mechanism, angular displacement motion of the flap should be ensured despite the large centrifugal force and the centrifugal moment corresponding to the distance from the hinge axis to the center of mass of the flap.

When the flap hinge mechanism is configured from a bearing or other such mechanical shaft support, the size and weight of the shaft support increases due to the large thrust load created by the centrifugal force. Because the flap is typically mounted at the trailing edge of the blade, the space available for!mounting of the hinge mechanism will naturally be limited. In particular, because the hinge mechanism cannot be allowed to protrude excessively from the blade surface due to aerodynamic concerns, a thin hinge mechanism will be required. Decreased hinge performance resulting from designs emphasizing thinness of the hinge can then lead to increased size and weight of the actuator for driving the flap. There is thus the problem of the difficulty in achieving both mechanism thinness and support of the centrifugal force.

One possible approach, instead of such mechanical shaft support, would be to adopt a hinge mechanism in the form of a metal plate spring which makes use of elastic deformation. For the fatigue strength to withstand cyclical angular displacement vibration of the flap and in order to prevent actuator drive force losses, however, it would be necessary to form a portion of low stiffness having a certain spring length or more, but doing so would create a tendency toward flexural deformation in the out of plane direction of the plate spring, and shifting of the axis of angular displacement would make precise control of the flap difficult.

SUMMARY

The object of the invention is to provide a flap hinge mechanism that can be made thin and light and yet allow achievement of smooth flap motion in spite of large centrifugal forces and a method for manufacturing the same as well as a flap hinge apparatus.

The invention provides a flap hinge mechanism for attaching a flap to a helicopter rotor blade, comprising:

a blade-secured portion secured to the blade, a flap-secured portion secured to the flap, and a coupling portion for coupling the blade-secured portion and the flap-secured portion so as to permit angular displacement, wherein the mechanism is constructed of a composite material in which fibers of the blade-secured portion and flap-secured portion are impregnated with a matrix, and fibers of the coupling portion are not impregnated with a matrix.

In accordance with the invention, by constructing the flap hinge mechanism of a composite material wherein fibers of the blade-secured portion and flap-secured portion are impregnated with a matrix, a member which is light but has high strength can be obtained. Furthermore, as a result of the fact that the fibers of the coupling portion are not impregnated with a matrix, it is possible to impart the flap hinge mechanism with hinge properties of high strength and flexibility.

Furthermore, when the rotor blade rotates and centrifugal forces act on the flap, large centrifugal forces can be supported due to the tensile strength of the fibers of the coupling portion.

Furthermore, the invention provides a flap hinge mechanism for attaching a flap to a helicopter rotor blade, comprising:

a blade-secured portion secured to the blade, a flap-secured portion secured to the flap, and a coupling portion for coupling the blade-secured portion and the flap-secured portion so as to permit angular displacement, wherein the mechanism is constructed of a composite material in which fibers of the blade-secured portion and flap-secured portion are impregnated with a first matrix, and fibers of the coupling portion are impregnated with a second matrix lower in stiffness than the first matrix.

In accordance with the invention, by constructing the flap hinge mechanism of a composite material such that the fibers of the blade-secured portion and flap-secured portion are impregnated with the first matrix, a member which is light but has high strength can be obtained. Furthermore, as a result of the fact that the fibers of the coupling portion are impregnated with the second matrix lower in stiffness than the first matrix, it is possible to impart the flap hinge mechanism with hinge properties of high strength and flexibility.

Furthermore, when the rotor blade rotates and centrifugal forces act on the flap, large centrifugal forces can be supported as a result of the tensile strength of the fibers of the coupling portion.

Furthermore, in the invention it is preferable that the coupling portion includes fibers for which an angle of intersection a between a direction of the fibers and a blade span direction is 10° to 45°.

In accordance with the invention, causing the angle of intersection a between the direction of fibers of the coupling portion and the blade span direction to be 10° to 45° makes it possible for 98% (=cos 10°) to 70% (=cos 45°) of the forces acting to the fibers of the coupling portion to support the centrifugal force while maintaining the softness of the hinge.

Furthermore, the coupling portion may be constructed of unidirectional fibrous sheeting, two-dimensional woven material, or three-dimensional woven material, in monolayer form or as a laminated combination thereof In the case where a plurality of fiber directions are present, the tensile load component acting to support the centrifugal force will be greater for fibers having smaller angles of intersection $\alpha$.

Furthermore, in the invention it is preferable that the coupling portion is formed of woven fabric. In accordance with the invention, by forming the coupling portion of woven fabric wherein warp and weft are woven together, it is possible to ensure softness of the hinge while increasing strength with respect to loads acting within the plane of the woven fabric.

Furthermore, in the invention it is preferable that a relationship represented by the following expression is satisfied:

$$0 < d \; \Delta\theta \cdot a$$

wherein d is a length of the coupling portion, $\Delta\theta$ is an error in a set flap angle, and a is a length of a flap horn arm. In accordance with the invention, because, if the length d of the coupling portion becomes too large, hinge softness will increase and there is a tendency for flexural deformation in the out of plane direction to occur, as a strategy to prevent this, the length d of the coupling portion is set so as to be not more than the product of the flap angle setting error $\Delta\theta$ and the flap horn arm length a, permitting prevention of out of plane flexural deformation.

Furthermore, the invention provides a method for manufacturing a flap hinge mechanism for attaching a flap to a helicopter rotor blade comprising a blade-secured portion secured to the blade, a flap-secured portion secured to the flap, and a coupling portion coupling the blade-secured portion and the flap-secured portion so as to permit angular displacement. The method comprises the steps of:

impregnating an area of a woven fabric to be the coupling portion with a soft resin;

impregnating areas of a woven fabric to be the blade-secured portion and the flap-secured portion with an adhesive; and placing a distance adjustment jig between the blade and the flap and adhesively securing the blade-secured portion and the blade to adhesively secure the flap-secured portion and the flap together.

In accordance with the invention, as a result of previously impregnating with a soft resin the area to be the coupling portion, in coupling the woven fabric of the blade and the woven fabric of the flap, it is possible to ensure the softness of the hinge mechanism since prevention of permeation of adhesive into the coupling portion is permitted. Furthermore, as a result of placement of the distance adjustment jig between the blade and the flap, arbitrary adjustment of the gap between the blade and the flap is permitted, and improvement in the precision of the positioning of the blade and the flap, e.g., parallelism or the like, is permitted.

The adhesive functions as the first matrix for the blade-secured portion and the flap-secured portion, and the soft resin functions as the second matrix for the coupling portion, the overall hinge mechanism consequently being constructed of a composite material.

Furthermore, the invention provides a flap hinge apparatus for attaching a flap to a helicopter rotor blade, comprising:

a composite-material hinge portion constructed of a composite material, for coupling the blade and the flap so as to permit angular displacement; and a mechanical hinge portion for coupling the blade and the flap so as to permit angular displacement about the same hinge axis as that of the composite-material hinge portion.

In accordance with the invention, the composite-material hinge portion supports the bulk of the centrifugal force, and the mechanical hinge portion prevents out of plane flexural deformation of the composite-material hinge portion. Whereas the composite-material hinge portion permits imparting of hinge properties of high strength and flexibility but is susceptible to radial deviation of axis due to out of plane flexural deformation, the mechanical hinge portion is free from concern with respect to radial deviation of axis but increases in size and weight would be unavoidable if increased strength were to be attempted with the mechanical hinge portion alone. Accordingly, combined use of both so that the mutual strengths and weaknesses compensate for each other permits attainment of a hinge mechanism that is high in strength and yet thin and light, and permits attainment of smooth flap motion despite the presence of centrifugal forces.

Furthermore, in the invention it is preferable that the mechanical hinge portion is composed of a bearing. In accordance with the invention, composing the mechanical hinge portion of a bearing permits a small and light yet stable hinge axis to be obtained but also permits definitive prevention of out of plane flexural deformation at the composite-material hinge portion.

Furthermore, in the invention it is preferable that the mechanical hinge portion is composed of a first elastic member for coupling a top surface of the blade and a bottom surface of the flap, and a second elastic member for coupling a bottom surface of the blade and a top surface of the flap. In accordance with the invention, use of a plurality of elastic members so as to couple the top surface of the blade and the bottom surface of the flap, and the bottom surface of the blade and the top surface of the flap, so as to form an intersection in an x-shaped fashion, makes it possible to obtain a hinge mechanism wherein an intersection portion of the elastic members serves as hinge axis. Because there is no sliding component in such a hinge mechanism, it excels in endurance and in its capacity for reductions in size and weight, while also permitting definitive prevention of out of plane flexural deformation of the composite-material hinge portion due to the restoring force of the elastic member.

DESCRIPTION OF THE DRAWINGS

Other and further objects, features, and advantages of the invention will be more explicit from the following detailed description taken with reference to the drawings wherein:

FIG. 7 is a plan view of a fifth embodiment for carrying out the invention;

DETAILED DESCRIPTION OF THE PREFERRED EMBODIMENTS

Figure 1:
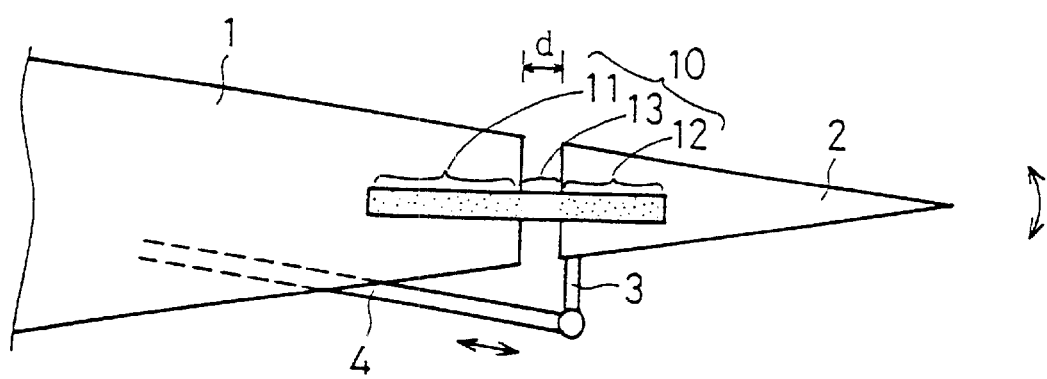
FIG. 1 is a view showing the constitution of a first embodiment for carrying out the invention.

Now referring to the drawings, preferred embodiments of the invention are described below.

FIG. 1 is a view showing the constitution of a first embodiment for carrying out the invention. Flap hinge mechanism 10 is for attachment of a flap 2 so as to permit angular displacement with respect to a helicopter rotor blade 1. The cross-sectional view along the blade 1 chord direction is shown for ease in understanding. Flap 2 is typically provided in the blade tip side where airspeed is greatest and at the trailing edge of the blade so as to constitute a portion of the blade airfoil.

Provided at the interior of blade 1 is an actuator (not shown) for driving the flap. A drive rod 4 and horn arm portion 3 of flap 2 are joined by means of a pin and form a drive link mechanism. Displacement of drive rod 4 in the axial direction as a result of driving of the actuator causes flap 2 to be angularly displaced upward or downward about the hinge axis. Such flap control permits improvement in the aerodynamic characteristics of the rotor blade, making a reduction in audible noise, for example, possible.

Flap hinge mechanism 10 comprises a blade-secured portion 11 which is secured to blade 1, a flap-secured portion 12 which is secured to flap 2, and a coupling portion 13 which couples blade-secured portion 11 and flap-secured portion 12 so as to permit angular displacement. Blade-secured portion 11, coupling portion 13, and flap-secured portion 12 are constructed of fiber serving as composite material, the fibers of blade-secured portion 11 and flap-secured portion 12 being impregnated with matrices, and the fibers of coupling portion 13 not being impregnated with a matrix.

Such a structure permits coupling portion 13 to be imparted with hinge properties of high strength and flexibility. Furthermore, because blade-secured portion 11 and flap-secured portion 12 are formed of composite material comprising matrix and fiber, members which are low in weight yet high in strength can be obtained. It is preferred that blade 1 and flap 2 also are constructed of composite material, blade-secured portion 11 and flap-secured portion 12 being secured by means of adhesive or the like.

Unidirectional fibrous sheeting, two-dimensional woven material, or three-dimensional woven material, in monolayer form or as a laminated combination thereof, may be used as fiber from which to construct flap hinge mechanism 10. Furthermore, fiberglass, KEVLAR (poly (p-phenyleneterephthalamide)) fiber, carbon fiber, or the like may be used as fiber the material; and epoxy resin, bismaleimide resin, polyimide resin, or the like may be used as the matrix material.

Figure 2A:
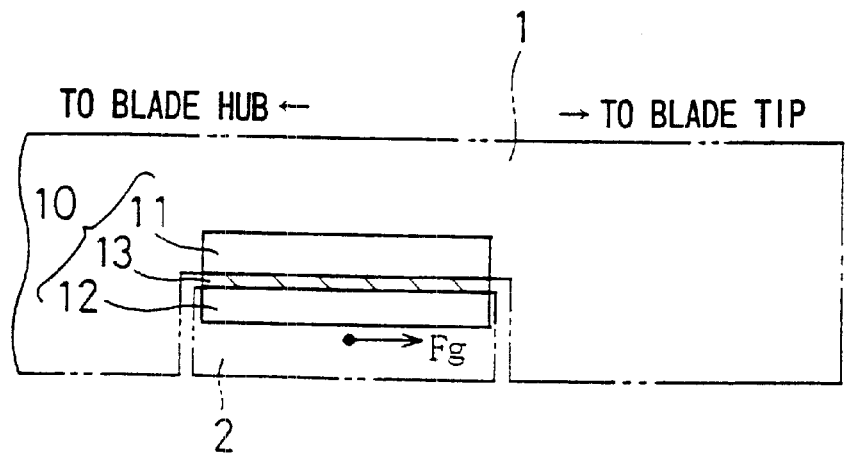
FIG. 2A is a plan view of flap hinge mechanism 10 as seen from above a blade.
Figure 2B:
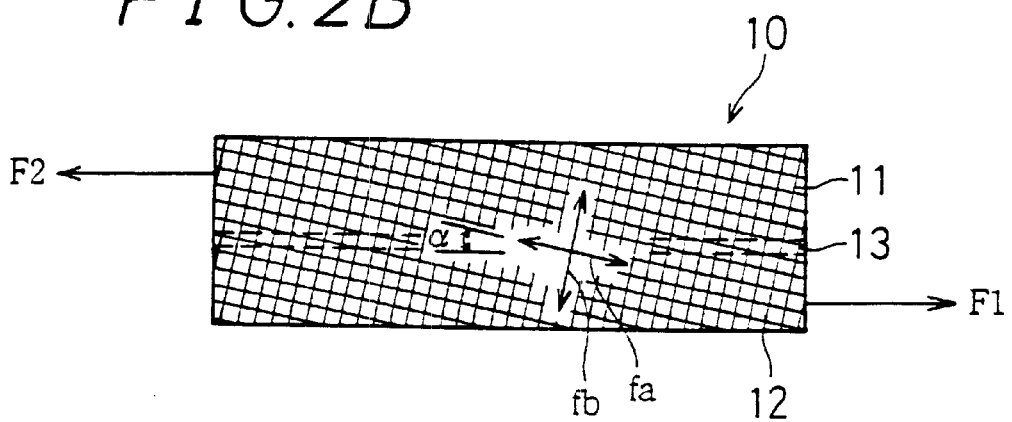
FIG. 2B is a plan view showing fiber direction.

FIG. 2A is a plan view of flap hinge mechanism 10 as seen from above the blade, and FIG. 2B is a plan viewing showing fiber direction. The trailing edge of blade 1 is cut out in correspondence to the shape of flap 2, and flap 2 is attached at this cutout portion.

Blade-secured portion 11 is secured to blade 1, flap-secured portion 12 is secured to flap 2, and coupling portion 13 couples blade-secured portion 11 and flap-secured portion 12 so as to permit angular displacement, forming a hinge axis which is more or less parallel to the blade span direction.

Because rotation of blade 1 about the main rotor shaft causes action of a large centrifugal force Fg at the center of mass of flap 2, it is necessary that coupling portion 13 support centrifugal force Fg and ensure flap motion.

FIG. 2B shows an example in which woven fabric wherein warp and weft are woven together is used as the fiber of which the flap hinge mechanism 10 is formed. Because the action of centrifugal force Fg on flap 2 causes the action of loads F1 and F2 within the plane of the woven fabric, it is preferred that a coupling portion 13 fiber direction be made as parallel as possible to the blade span direction, which is the direction in which centrifugal force Fg acts; however, making fiber direction perfectly parallel thereto will result in there being no fibers to support centrifugal force Fg at coupling portion 13.

Setting the angle of intersection α between a direction of fibers of coupling portion 13 and the blade span direction so as to therefore fall within the range 10° to 45° makes it possible for 98% (=cos 10°) to 70% (=cos 45°) of the forces acting to the tensile strength of fibers of coupling portion 13 to support the centrifugal force while maintaining the softness of the hinge. For example, as shown in FIG. 2B, fibers fa directed from the blade hub side of blade-secured portion 11 to the blade tip side of flap-secured portion 12 support centrifugal force Fg, while fibers fb in a direction perpendicular to these fibers fa primarily maintain hinge softness.

Moreover, unidirectional fibrous sheeting, two-dimensional woven material, or three-dimensional woven material, in monolayer form or as a laminated combination thereof, may be used as fiber from which to construct flap hinge mechanism 10. Where a plurality of fiber directions are present the tensile load component acting to support the centrifugal force will be greater for fibers having smaller angles of intersection α.

Figure 3A:
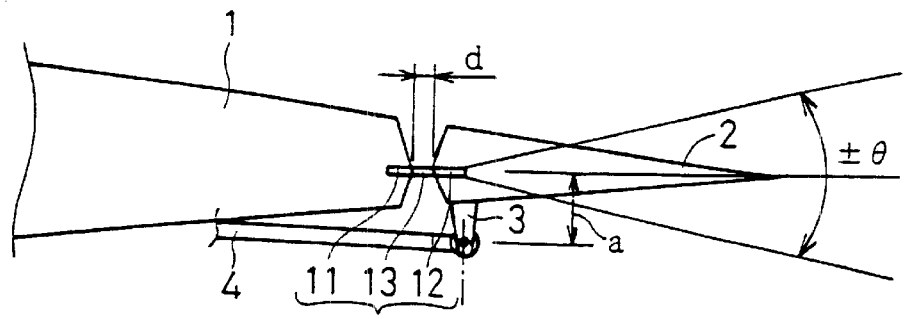
FIGS. 3A through 3D are explanatory views showing coupling portion 13 and length d design methodology.
Figure 3B:
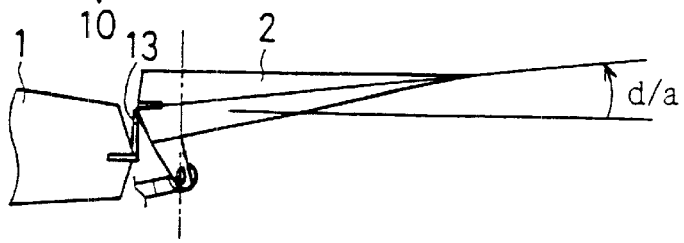
Figure 3C:
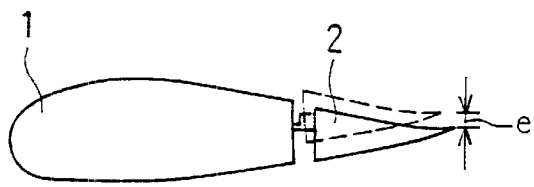
Figure 3D:
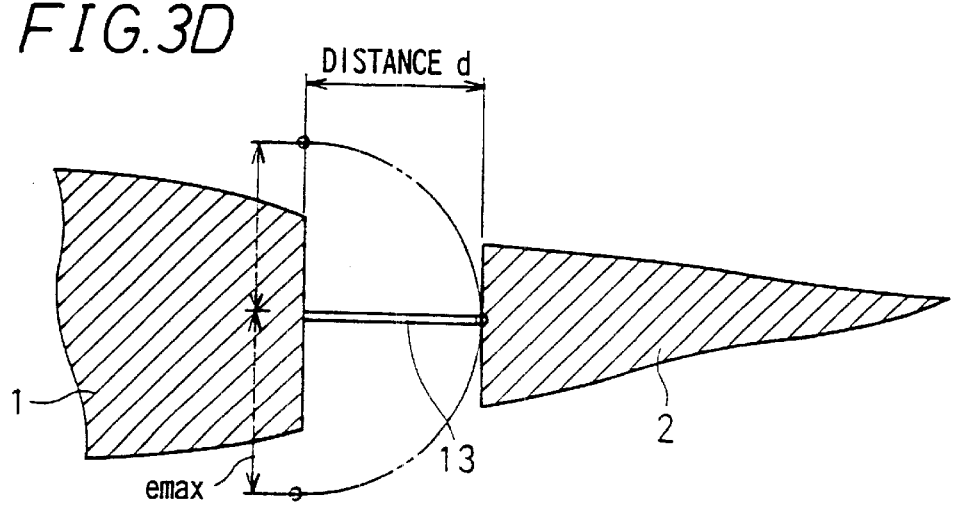

FIGS. 3A through 3D. are explanatory views showing coupling portion 13 and length d design methodology. As shown in FIG. 3A, in moving flap 2 by an angle ±θ about the hinge axis, drive rod 4 must be moved by an amount ±a·θ, where a is the arm length of horn arm portion 3. At this time, as shown in FIG. 3C, the presence of length d of coupling portion 13 produces a hinge offset e due to out of plane deformation of coupling portion 13, the maximum value emax of this offset corresponding, as shown in FIG. 3D, to length d. Accordingly, deformation of coupling portion 13 by maximum offset emax results in a situation on the same order as that which occurs when there is an input of displacement d (=emax) from drive rod 4. That is, as shown in FIG. 3B, length d of coupling portion 13 permits occurrence of an error d/a in flap angle.

In short, satisfaction of the relationship flap angle setting error Δθ≧d/a permits attainment of high-precision flap drive. A variation on this formula yields the result that it is preferred that length d of coupling portion 13 be such that the relationship 0<d≦Δθ·a is satisfied. For example, with a hinge mechanism 10 wherein arm length a=10 mm and flap angle setting error Δθ=±1° (=2°), we have Δθ·a=2°×π/180°× 10 mm=0.35 mm, and it is preferred that length d of coupling portion 13 be set to 0.35 mm or less.

Figure 4A:
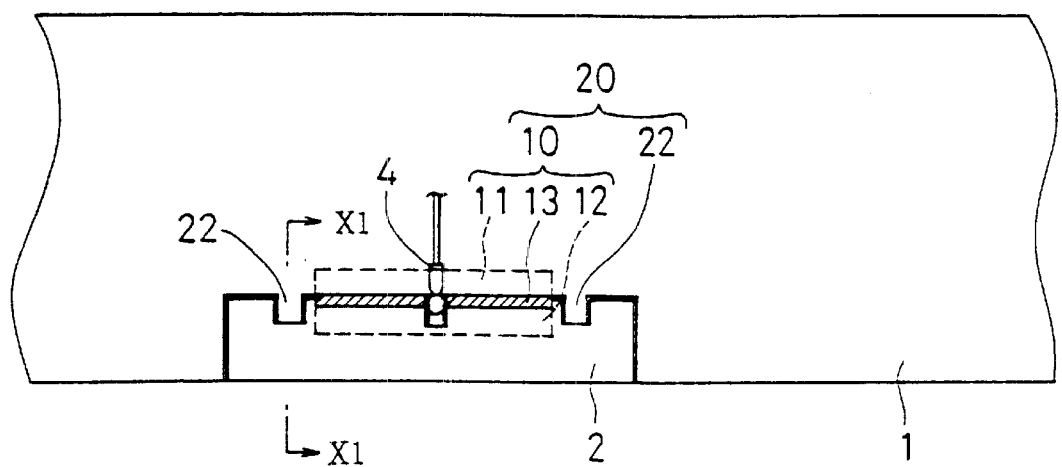
FIGS. 4A and 4B are views showing the constitution of a second embodiment for carrying out the invention, FIG. 4A being a plan view and FIG. 4B being a cross-sectional view of section X1—X1 in FIG. 4A.
Figure 4B:
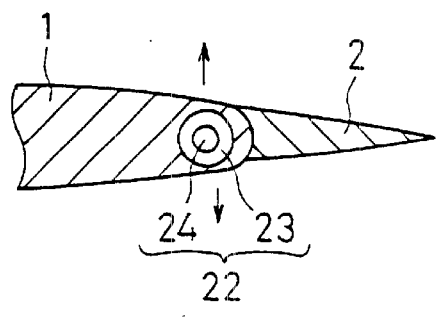

FIGS. 4A and 4B are views showing the constitution of a second embodiment for carrying out the invention, FIG. 4A being a plan view and FIG. 4B being a cross-sectional view of section X1—X1 in FIG. 4A. Flap hinge apparatus 20 is for attachment of a flap 2 so as to permit angular displacement with respect to a helicopter rotor blade 1, and comprises a flap hinge mechanism 10 constructed of composite material and a mechanical hinge mechanism 22 having the same hinge axis as flap hinge mechanism 10.

As shown in FIG. 1, flap hinge mechanism 10 comprises a blade-secured portion 11 which is secured to blade 1, a flap-secured portion 12 which is secured to flap 2, and a coupling portion 13; which couples blade-secured portion 11 and flap-secured portion 12 so as to permit angular displacement, the fibers of blade-secured portion 11 and flap-secured portion 12 being impregnated with matrices, and the fibers of coupling portion 13 not being impregnated with a matrix. Flexibility of coupling portion 13 allows blade 1 and flap 2 to be coupled so as to permit angular displacement.

As shown in FIG. 4B, mechanical hinge mechanism 22 comprises a bearing 23 which supports flap support shaft 24, and one of such mechanical hinge mechanisms 22 is arranged at either side of flap hinge mechanism 10 along the hinge axis thereof, the two mechanical hinge mechanisms 22 coupling blade 1 and flap 2 so as to permit angular displacement.

Because flap hinge mechanism 10 is constructed of composite material it can be imparted with hinge properties of high strength and flexibility, but, as described above, there is the possibility of radial deviation of the axis due to out of plane flexural deformation at coupling portion 13. To address this, mechanical hinge mechanism 22 is also provided in coaxial fashion in combination therewith, permitting prevention of such radial deviation of the axis. Furthermore, because the bulk of the centrifugal force acting on flap 2 is supported by flap hinge mechanism 10, a small, light mechanism will suffice as mechanical hinge mechanism 22.

In this way, combined use of mechanical hinge mechanism 22 and flap hinge mechanism 10 comprising composite material permits. attainment of a hinge mechanism that is high in strength and yet thin and light, and permits attainment of smooth flap motion despite the presence of centrifugal forces.

Figure 5A:
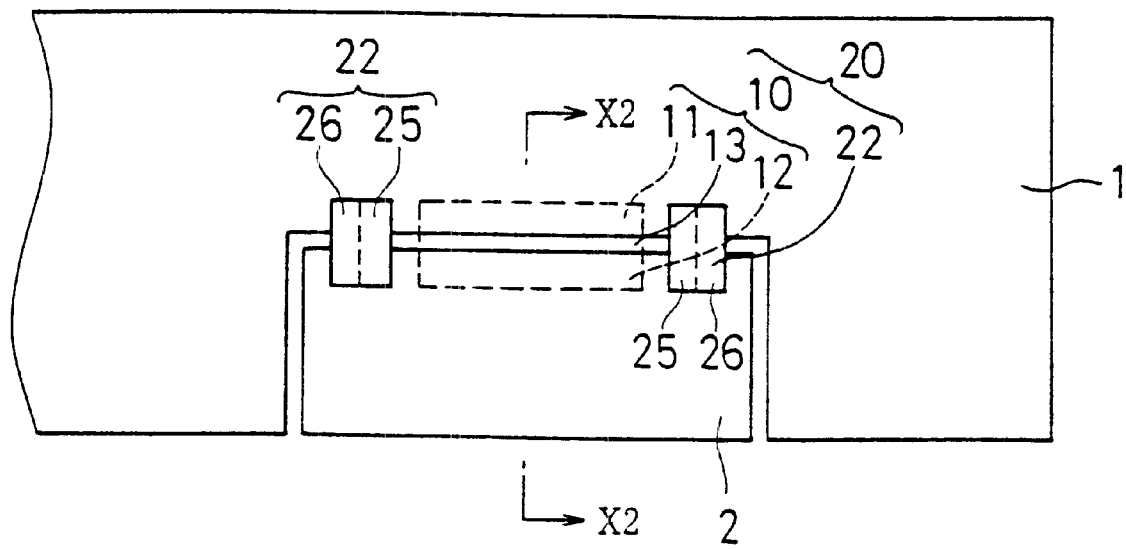
FIGS. 5A and 5B are views showing the constitution of a third embodiment for carrying out the invention, FIG. 5A being a plan view and FIG. 5B being a cross-sectional view of section X2—X2 in FIG. 5A.
Figure 5B:
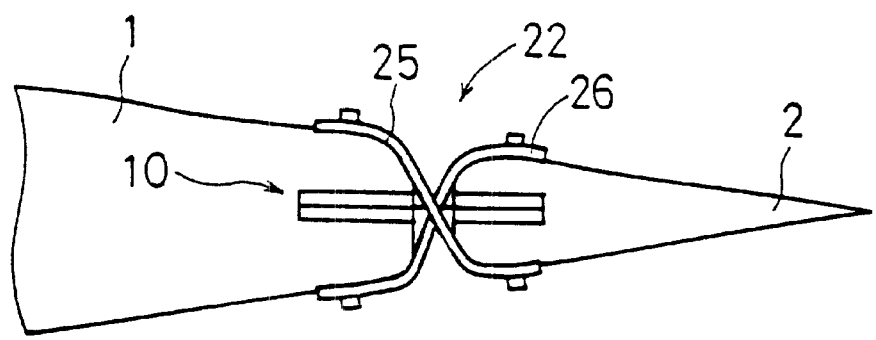

FIGS. 5A and 5B are views showing the constitution of a third embodiment for carrying out the invention, FIG. 5A being a plan view and FIG. 5B being a cross-sectional view of section X2—X2 in FIG. 5A. Flap hinge apparatus 20 is for attachment of a flap 2 so as to permit angular displacement with respect to a helicopter rotor blade 1, and comprises a flap hinge mechanism 10 constructed of composite material and a mechanical hinge mechanism 22 having the same hinge axis as flap hinge mechanism 10. Flap hinge mechanism 10 is similar to that shown in FIG. 1.

As shown in FIG. 5B, mechanical hinge mechanism 22 is constructed of an elastic member 25 which couples the top surface of blade 1 and the bottom surface of flap 2 and an elastic member 26 which couples the bottom surface of blade 1 and the top surface of flap 2. One of such mechanical hinge mechanisms 22 is arranged at either side of flap hinge mechanism 10 along the hinge axis thereof. The two mechanical hinge mechanisms 22 couple blade 1 and flap 2 so as to permit angular displacement. Elastic members 25 and 26 are arranged symmetrically so as to intersect in an x-shaped fashion. Support of the angular displacement of flap 2 is achieved by complementary flexural deformation of elastic members 25 and 26. The approximate point of intersection of the two members is the center of angular displacement of flap 2, corresponding to the hinge axis of flap hinge mechanism 10.

Provision of such a mechanical hinge mechanism 22 in coaxial fashion in combination with flap hinge mechanism 10 permits attainment of a hinge mechanism that is high in strength and yet thin and light, and permits attainment of smooth flap motion despite the presence of centrifugal forces.

Figure 6A:
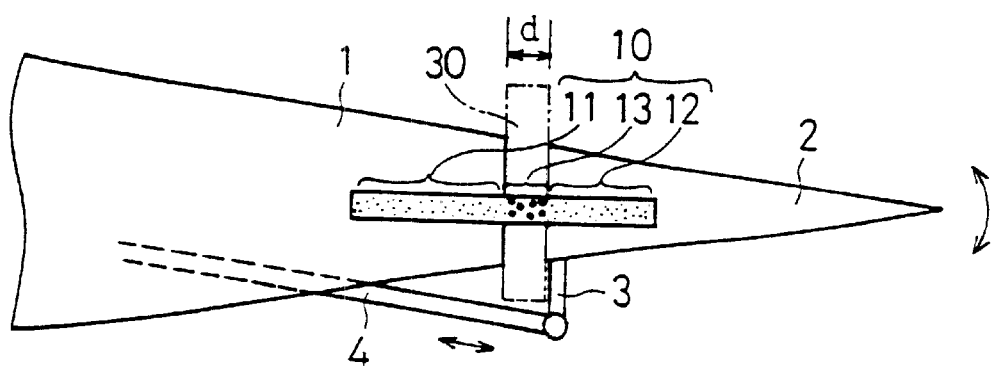
FIGS. 6A and 6B are views showing the constitution of a fourth embodiment for carrying out the invention, FIG. 6A being a cross-sectional view and FIG. 6B being a plan view.
Figure 6B:
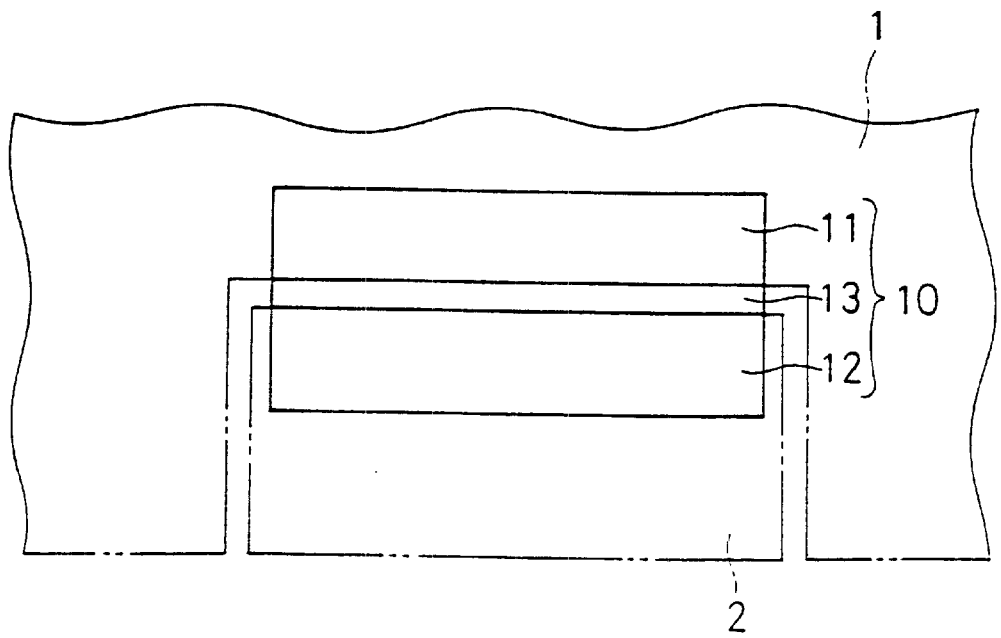

FIGS. 6A and 6B are views showing the constitution of a fourth embodiment for carrying out the invention, FIG. 6A being a cross-sectional view and FIG. 6B being a plan view. Flap hinge mechanism 10 comprises a blade-secured portion 11 which is secured to blade 1, a flap-secured portion 12 which is secured to flap 2, and a coupling portion 13 which couples blade-secured portion 11 and flap-secured portion 12 so as to permit angular displacement. While the overall structure and function are similar to the embodiment shown in FIG. 1, the structure of the coupling portion 13 is different.

Blade-secured portion 11, coupling portion 13, and flap-secured portion 12 are constructed of fiber serving as composite material, fibers of blade-secured portion 11 and flap-secured portion 12 being impregnated with a first matrix, and fibers of coupling portion 13 being impregnated with a second matrix lower in stiffness than the first matrix. A combination, for example, of epoxy resin and rubber-type resin or the like is preferred as a combination to serve as the first matrix and second matrix.

Such a structure makes it is possible to impart coupling portion 13 with hinge properties of high strength and flexibility, and moreover, because the fibers of coupling portion 13 are protected by the second matrix, the service life and endurance are improved.

Next, a method for the manufacture of flap hinge mechanism 10 will be described. First, woven fabric which will serve as composite material fiber of which the flap hinge mechanism 10 will be formed is prepared and is cut in shapes to comprise blade-secured portion 11, coupling portion 13, and flap-secured portion 12. Next, that area of the woven fabric which will serve as coupling portion 13 is impregnated with soft resin serving as second matrix. Next, those areas of the woven fabric which will serve as blade-secured portion 11 and flap-secured portion 12 are impregnated with adhesive serving as first matrix. Following this, as shown in FIG. 6A, a distance adjustment jig 30 is placed between blade 1 and flap 2 and the respective components are positioned such that the gap between blade 1 and flap 2, i.e., length d of coupling portion 13, will be a desired value. Following this, curing of the adhesive causes blade-secured portion 11 and blade 1 to be adhesively secured together and flap-secured portion 12 and flap 2 to be adhesively secured together.

FIGS. 6A and 6B are views showing the constitution of a fourth embodiment for carrying out the invention, FIG. 6A By thus previously impregnating with soft resin serving as second matrix that area that is to be coupling portion 13, it is possible to prevent permeation of adhesive into coupling portion 13 and it is possible to ensure the softness of the hinge mechanism- Furthermore, as a result of placement of distance adjustment jig 30 between blade 1 and flap 2, arbitrary adjustment of the gap between blade 1 and flap 2 is permitted, and improvement in the precision of the positioning of blade 1 and flap 2, e.g., parallelism or the like, is permitted.

FIG. 7 is a plan view of a fifth embodiment for carrying out the invention. A plurality (three in the present case) of flap hinge mechanisms 10 are arranged independently between blade 1 and flap 2 so as to share a common hinge axis. As the several flap hinge mechanisms 10, the mechanisms indicated in FIG. 1 or in FIGS. 6A and 6B may be used.

As a result of such divided arrangement of flap hinge mechanisms 10, in the event that one of the flap hinge mechanisms 10 becomes damaged, spreading of damage to the other flap hinge mechanisms 10 is prevented, permitting improvement in overall hinge reliability and failsafe characteristics.

Figure 8A:
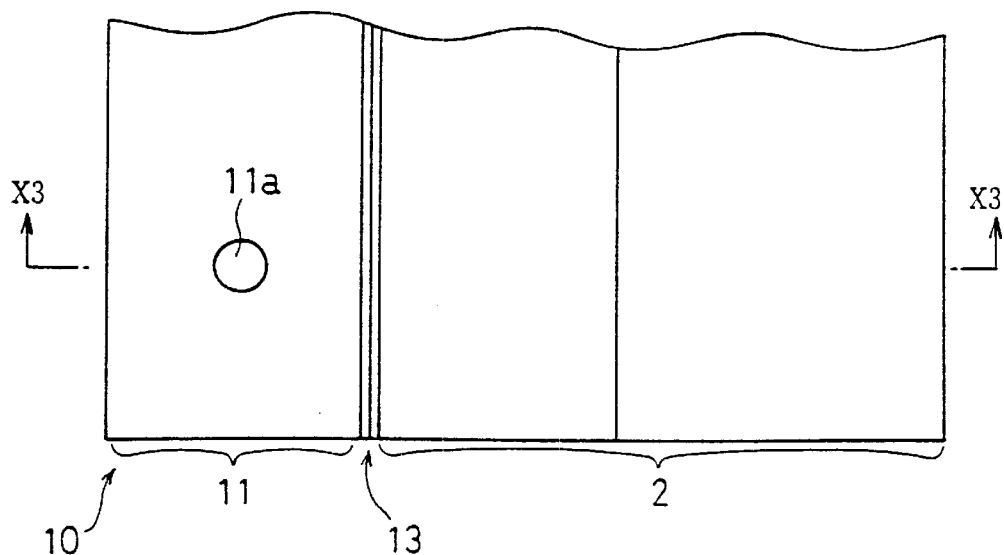
FIGS. 8A through 8C are views showing the constitution of a sixth embodiment for carrying out the invention, FIG. 8A being a plan view, FIG. 8B being a cross-sectional view of section X3—X3 in FIG. 8A, and FIG. 8C being an enlarged view of coupling portion 13.
Figure 8B:
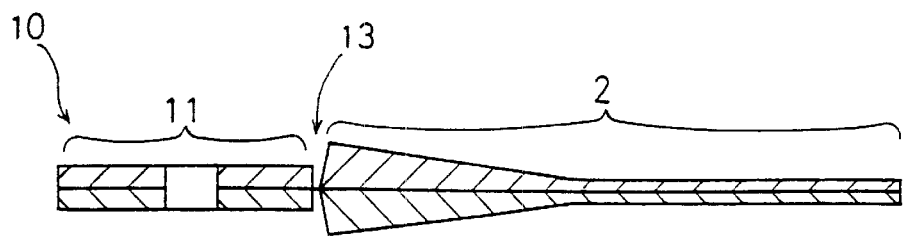
Figure 8C:
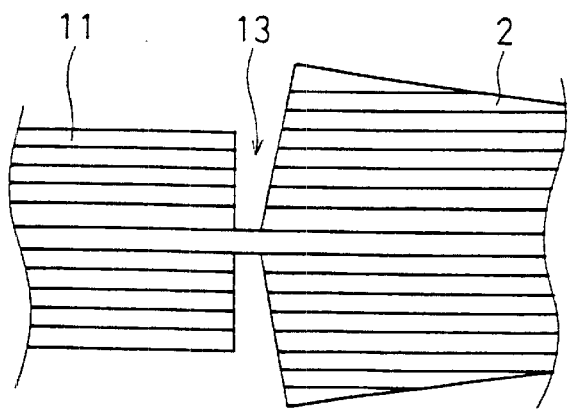
Figure 9:
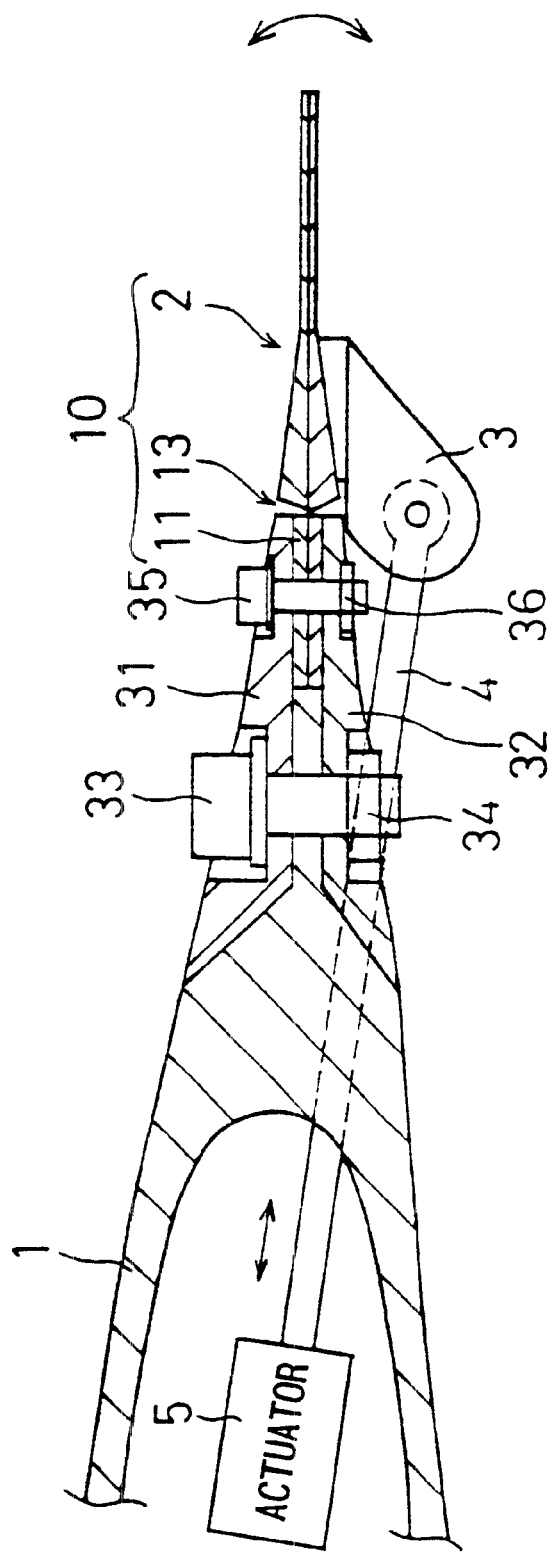
FIG. 9 is a cross-sectional view showing mounting of a flap hinge mechanism 10 of FIGS. 8A through 8C.

FIGS. 8A through 8C are views showing the constitution of a sixth embodiment for carrying out the invention, FIG. 8A being a plan view, FIG. 8B being a cross-sectional view on section X3—X3 in FIG. 8A, and FIG. 8C being an enlarged view of coupling portion 13. FIG. 9 is a cross-sectional view showing mounting of the flap hinge mechanism 10 in FIGS. 8A through 8C. Here, an example has been shown in which flap hinge mechanism 10 and flap 2 have been integrally formed from composite material.

Flap hinge mechanism 10 comprises a blade-secured portion 11 which is secured to blade 1, a flap 2 which is integral with a flap-secured portion, and a coupling portion 13 which couples blade-secured portion 11 and flap 2 so as to permit angular displacement.

Blade-secured portion 11, coupling portion 13, and flap 2 are formed of fiber serving as composite material. The fibers of blade-secured portion 11 and flap 2 are impregnated with matrices. The fibers of coupling portion 13 are either not impregnated with a matrix, as with the embodiment of FIG. 1, or are impregnated with a matrix lower in stiffness than the matrices of the blade-secured portion 11 and flap 2, as with the embodiment of FIG. 6, and thus coupling portion 13 is imparted with hinge properties of high strength and flexibility.

As shown in FIG. 8C, the composite material structure is such that coupling portion 13 is formed of one or more layers of woven fabric such that hinge softness is ensured, while desired thicknesses are obtained for blade-secured portion 11 and flap 2 as a result of lamination of multiple layers of woven fabric or the like.

A number of attachment holes 11a are formed in blade-secured portion 11, and, as shown in FIG. 9, attachment members 31 and 32 straddle blade 1 and blade-secured portion 11 from either face thereof, being joined by means of bolts 33 and 35 and nuts 34 and 36.

Provided at the interior of blade 1 is an actuator 5 for driving the flap. Drive rod 4 and horn arm portion 3 of flap 2 are joined by means of a pin and form a drive link mechanism. Displacement of drive rod 4 in the axial direction as a result of driving actuator 5 causes flap 2 to be angularly displaced upward or downward about the hinge axis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A flap hinge mechanism for attaching a flap to a helicopter rotor blade, comprising:

a blade-secured portion secured to the blade, a flap-secured portion secured to the flap, and a coupling portion for coupling the blade-secured portion and the flap-secured portion so as to permit angular displacement, wherein the mechanism is constructed of a composite material in which fibers of the blade-secured portion and flap-secured portion are impregnated with a matrix, and fibers of the coupling portion are not impregnated with a matrix.

2. The flap hinge mechanism of claim 1, wherein the coupling portion includes fibers for which an angle of intersection a between a direction of the fibers and a blade span direction is 10° to 45°.

3. The flap hinge mechanism of claim 2, wherein the coupling portion is formed of woven fabric.

4. The flap hinge mechanism of claim 1, wherein a relationship represented by the following expression is satisfied:

$$0 < d \leq \Delta\theta \cdot a$$

wherein d is a length of the coupling portion, $\Delta\theta$ is an error in a set flap angle, and a is a length of a flap horn arm.

5. A flap hinge mechanism for attaching a flap to a helicopter rotor blade, comprising:

a blade-secured portion secured to the blade, a flap-secured portion secured to the flap, and a coupling portion for coupling the blade-secured portion and the flap-secured portion so as to permit angular displacement, wherein the mechanism is constructed of a composite material in which fibers of the blade-secured portion and flap-secured portion are impregnated with a first matrix, and fibers of the coupling portion are impregnated with a second matrix having a composition that renders said second matrix lower in stiffness than the first matrix and thus renders said coupling portion softer than said blade secured portion and said flap-secured portion.

6. The flap hinge mechanism of claim 5, wherein the coupling portion includes fibers for which an angle of intersection a between a direction of the fibers and a blade span direction is 10° to 45°.

7. The flap hinge mechanism of claim 5, wherein a relationship represented by the following expression is satisfied:

$$0 < d \leq \Delta\theta \cdot a$$

wherein d is a length of the coupling portion, $\Delta\theta$ is an error in a set flap angle, and a is a length of a flap horn arm.

8. A method for manufacturing a flap hinge mechanism for attaching a flap to a helicopter rotor blade, comprising a blade-secured portion secured to the blade, a flap-secured portion secured to the flap, and a coupling portion coupling the blade-secured portion and the flap-secured portion so as to permit angular displacement, the method comprising the steps of:

impregnating an area of a woven fabric to be the coupling portion with a soft resin;

impregnating areas of the woven fabric to be the blade-secured portion and the flap-secured portion with an adhesive; and placing a distance adjustment jig between the blade and the flap, and adhesively securing the blade-secured portion and the blade, to adhesively secure the flap-secured portion and the flap together.

9. A flap hinge apparatus for attaching a flap to a helicopter rotor blade, comprising:

a composite-material hinge portion formed of a composite material and coupling the blade and the flap so as to permit angular displacement about a hinge axis; and a mechanical hinge portion coupling the blade and the flap and having the same hinge axis as said composite-material hinge portion so as to permit angular displacement about the hinge axis of the composite-material hinge portion.

10. The flap hinge apparatus of claim 9, wherein the mechanical hinge portion is composed of a bearing.

11. The flap hinge apparatus of claim 9, wherein the mechanical hinge portion is composed of a first elastic member for coupling a top surface of the blade and a bottom surface of the flap, and a second elastic member for coupling a bottom surface of the blade and a top surface of the flap.

* * * * *